(12) United States Patent
Aker et al.

(10) Patent No.: US 9,407,159 B2
(45) Date of Patent: Aug. 2, 2016

(54) DYNAMIC FREQUENCY COMPENSATION OF SWITCHING POWER CONVERTERS

(71) Applicant: Aker Wade Power Technologies, LLC, Charlottesville, VA (US)

(72) Inventors: John Frederick Aker, Earlysville, VA (US); Andrey M. Peskov, Charlottesville, VA (US); Jonathan A. Brown, Charlottesville, VA (US)

(73) Assignee: AKER WADE POWER TECHNOLOGIES, LLC, Charlottesville, VA (US)

( * ) Notice: Subject to any disclaimer, the term of this patent is extended or adjusted under 35 U.S.C. 154(b) by 211 days.

(21) Appl. No.: 14/495,490

(22) Filed: Sep. 24, 2014

(65) Prior Publication Data

US 2015/0091525 A1 Apr. 2, 2015

Related U.S. Application Data

(60) Provisional application No. 61/883,449, filed on Sep. 27, 2013.

(51) Int. Cl.
*H02J 7/16* (2006.01)
*H02M 7/219* (2006.01)
(Continued)

(52) U.S. Cl.
CPC ............... *H02M 7/219* (2013.01); *B60L 3/003* (2013.01); *B60L 3/04* (2013.01); *B60L 11/1816* (2013.01); *H02J 7/0052* (2013.01); *B60L 2210/12* (2013.01); *B60L 2210/14* (2013.01);
(Continued)

(58) Field of Classification Search
CPC .......... H02J 7/0052; B60L 3/04; B60L 3/003; B60L 2210/12; B60L 2210/14; B60L 2210/30; H02M 2001/0012; H02M 2001/0054; H02M 2001/327; H02M 7/219
USPC ................. 320/104, 109, 144, 152, 163, 164; 323/271
See application file for complete search history.

(56) References Cited

U.S. PATENT DOCUMENTS

2006/0048983 A1 3/2006 Urakabe et al.
2010/0020581 A1 1/2010 Mazzola et al.
(Continued)

FOREIGN PATENT DOCUMENTS

RU 2449458 C1 4/2012
WO 2012142082 A1 10/2012

*Primary Examiner* — Edward Tso
*Assistant Examiner* — Aaron Piggush
(74) *Attorney, Agent, or Firm* — Hultquist, PLLC; Steven J. Hultquist (57) ABSTRACT

A kilowatt-scale high-frequency electrical power conversion system adapted for variable output power delivery is described, in which switching frequency of switchable power delivery circuitry is dynamically modulated in transition of the system to a low power regime that is substantially below maximum power output, in order to at least partially attenuate thermal overload from heat generation of switching components in such transitions. The system is useful in high-efficiency charging of rechargeable batteries of electrical vehicles, e.g., e.g., automotive, industrial, and other motive power vehicles.

25 Claims, 7 Drawing Sheets

(51) Int. Cl.
*H02J 7/00* (2006.01)
*B60L 3/00* (2006.01)
*B60L 3/04* (2006.01)
*B60L 11/18* (2006.01)
*H02M 1/00* (2006.01)
*H02M 1/32* (2007.01)

(52) U.S. Cl.
CPC ....... *B60L 2210/30* (2013.01); *B60L 2240/525* (2013.01); *H02M 2001/0012* (2013.01); *H02M 2001/0032* (2013.01); *H02M 2001/0054* (2013.01); *H02M 2001/327* (2013.01); *Y02T 10/7005* (2013.01); *Y02T 10/7072* (2013.01); *Y02T 10/7225* (2013.01); *Y02T 10/7233* (2013.01); *Y02T10/7241* (2013.01); *Y02T 10/92* (2013.01); *Y02T 90/127* (2013.01); *Y02T 90/14* (2013.01)

(56) References Cited

U.S. PATENT DOCUMENTS

2010/0213902 A1* 8/2010 Oliveira .............. B60L 11/1811 320/145
2012/0081068 A1* 4/2012 Odaohhara ............. H02J 7/045 320/107

* cited by examiner

FIG. 7

DYNAMIC FREQUENCY COMPENSATION OF SWITCHING POWER CONVERTERS

CROSS-REFERENCE TO RELATED APPLICATION

This application claims benefit under 35 U.S.C. §119 of U.S. Provisional Patent Application No. 61/883,449 filed Sep. 27, 2013. The disclosure of U.S. Provisional Patent Application No. 61/883,449 is hereby incorporated herein by reference in its entirety for all purposes.

FIELD

The present disclosure relates to kilowatt-scale high-frequency electrical power conversion systems adapted for variable output power delivery and requiring transitions to low power regimes in operation, as well as to methods of thermal management of operation of such systems.

BACKGROUND

In the design and provision of kilowatt-scale high-frequency electrical power conversion systems adapted for variable output power delivery, the switchable power delivery circuitry has been found to generate thermal overload conditions at power output level in a low power regime that is substantially below the maximum power output of the switchable power delivery circuitry. In this circumstance, the switching components of the switchable power delivery circuitry in the low power regime generate substantially higher heat than is generated by them in operation at power output level outside of said low power regime.

This detrimental condition shortens equipment life and reduces the efficiency of the power conversion system.

There is therefore a continuing need for kilowatt-scale high-frequency electrical power conversion systems that overcome this excessive heat generation problem when the system is required to operate in low power conditions.

SUMMARY

The present disclosure relates to kilowatt-scale high-frequency electrical power conversion systems adapted for variable output power delivery and requiring transitions to low power regimes in operation, as well as to methods of thermal management of operation of such systems.

In one aspect, the disclosure relates to a kilowatt-scale high-frequency electrical power conversion system adapted for variable output power delivery, in which the system comprises:
  switchable power delivery circuitry generating thermal overload at power output level in a low power regime that is substantially below maximum power output of the switchable power delivery circuitry, wherein switching components of the switchable power delivery circuitry in the low power regime generate substantially higher heat than is generated by them in operation at power output level outside of the low power regime; and
  frequency control circuitry adapted to dynamically reduce switching frequency of the switchable power delivery circuitry during transition from variable output power delivery operation outside of the low power regime to operation in the low power regime and to maintain switching frequency of the switchable power delivery circuit in the low power regime at sufficiently low level to at least partially reduce the substantially higher heat that would occur in the absence of the frequency control circuitry.

In another aspect, the disclosure relates to a method of operating a kilowatt-scale high-frequency electrical power conversion system adapted for variable output power delivery, and comprising switchable power delivery circuitry generating thermal overload at power output level in a low power regime that is substantially below maximum power output of said system, said method comprising dynamically reducing switching frequency of said switchable power delivery circuitry during transition from variable output power delivery operation outside of the low power regime to operation in said low power regime and maintaining switching frequency of said switchable power delivery circuit in said low power regime at sufficiently low level to at least partially reduce said substantially higher heat that would occur in the absence of the frequency control circuitry.

Other aspects, features and embodiments of the disclosure will be more fully apparent from the ensuing description and appended claims.

DETAILED DESCRIPTION

The present disclosure relates to kilowatt-scale high-frequency electrical power conversion systems adapted for variable output power delivery and requiring transitions to low power regimes in operation, as well as to methods of thermal management of operation of such systems.

As used herein, the term "kilowatt-scale" in reference to an electrical power conversion system means that the electrical power conversion system delivers electrical power of at least 1 kilowatt (Kw).

The term "high-frequency" as used herein in reference to an electrical power conversion system including switchable power delivery circuitry means a switching frequency of at least 5 kilohertz (KHz).

The present disclosure relates in various aspects to a kilowatt-scale high-frequency electrical power conversion system adapted for variable output power delivery, in which switching frequency of switchable power delivery circuitry is dynamically modulated in transition of the system to a low power regime that is substantially below maximum power output, in order to at least partially attenuate thermal overload from heat generation of switching components in such transitions.

In one aspect, the disclosure relates to a kilowatt-scale high-frequency electrical power conversion system adapted for variable output power delivery, in which the system comprises:
  switchable power delivery circuitry generating thermal overload at power output level in a low power regime that is substantially below, e.g., more than 70% below, maximum power output of the switchable power delivery circuitry, wherein switching components of the switchable power delivery circuitry in the low power regime generate substantially higher heat than is generated by them in operation at power output level outside of the low power regime; and frequency control circuitry adapted to dynamically reduce switching frequency of the switchable power delivery circuitry during transition from variable output power delivery operation outside of the low power regime to operation in the low power regime and to maintain switching frequency of the switchable power delivery circuit in the low power regime at sufficiently low level to at least partially reduce the substantially higher heat that would occur in the absence of the frequency control circuitry.

In such system, the switchable power delivery circuitry may be of any suitable type, and may for example comprise switchable MOSFET full bridge circuitry, or switchable IGBT circuitry, or other appropriate switchable circuitry. More generally, the switchable power delivery circuitry may be configured for operation in any suitable configuration, e.g., as a buck converter, boost converter, buck-boost converter, forward converter, full bridge converter, or half bridge converter.

As described more fully hereinafter, the frequency control circuitry in a specific embodiment may be comprised in a digital controller that is programmatically arranged with firmware enabling the digital controller to control switching frequency of the switchable power delivery circuitry. In such digital controller arrangement, the firmware may be constituted to specify (i) a switching point current value of at which the transition to operation in the low power regime is triggered, (ii) a value of target current for pulse width modulation operation or phase control operation of the switchable power delivery circuitry in the low power regime of the switchable power delivery circuitry in the low power regime, and (iii) a current increase value for reversing transition of the switchable power delivery circuitry to operation outside of the low power regime.

In specific embodiments, the frequency control circuitry may be configured for hysteresis operation so that output current of the system is stabilized to a new target current prior to initiation of a frequency change.

The frequency control circuitry may be configured in any suitable manner. In specific embodiments, the frequency control circuitry is configured for operation of the switchable power delivery circuitry outside the low power regime at a first switching frequency, and operation of the switchable power delivery circuitry in the low power regime at a second switching frequency. In other embodiments, the frequency control circuitry may be configured for operation of the switchable power delivery circuitry in multiple discrete power domains between the maximum power output and the low power regime.

The electrical power conversion system of the present disclosure, in particular implementations, may be configured for charging of batteries of motive vehicles, e.g., electric automotive vehicles.

In the electrical power conversion system of the present disclosure, the switching components of the switchable power delivery circuitry in the low power regime generate substantially higher heat than is generated by them in operation at power output level outside of the low power regime, and such switching components in the low power regime may even generate substantially higher heat than is generated by them in operation at much higher power output of the switchable power delivery circuitry. The dynamic frequency modulation approach of the present disclosure is effective to thermally manage the transitions of the switchable power delivery circuitry to such low power regimes without excessive generation of heat in the switching components of the switchable power delivery circuitry, so that high-efficiency power delivery and long service life of the power conversion system are achieved.

The power conversion system of the present disclosure may be of any suitable power delivery capability, and may for example be adapted to deliver power in a range of from 5 to 50 Kilowatts, or in a range of from 10 to 30 Kilowatts, or in other suitable range. The frequency control circuitry in the power conversion system may correspondingly be configured to control power delivery operation within any suitable frequency range from the low power regime to the maximum power output, e.g., wherein such frequency range with present semiconductor technology for large transistors is within a range of from 15 to 100 KHz, or within a range of from 20 to 80 KHz, or within other appropriate range. It will be recognized that the disclosure is not thus limited, and that the frequency modulation power conversion systems of the present disclosure may be utilized with semiconductor transistor circuitry in the megahertz and/or other frequency ranges.

In the power conversion system of the present disclosure, the low power regime is substantially below the maximum power output of the switchable power delivery circuitry, typically more than 70% below maximum power output of the switchable power delivery circuitry, and in various embodiments may be more than 75%, 80%, 85%, or 90% below such maximum power output level. For example, the low power regime may comprise a power output range that is within a range of from 5% to 25% of the maximum power output of the switchable power delivery circuitry.

The disclosure also contemplates a method of operating a kilowatt-scale high-frequency electrical power conversion system adapted for variable output power delivery, and comprising switchable power delivery circuitry generating thermal overload at power output level in a low power regime that is substantially below the maximum power output of the system, e.g., more than 70% below the maximum power output of the system. Such method includes dynamically reducing switching frequency of the switchable power delivery circuitry during transition from variable output power delivery operation outside of the low power regime to operation in the low power regime and maintaining switching frequency of the switchable power delivery circuit in the low power regime at sufficiently low level to at least partially reduce the substantially higher heat that would occur in the absence of the frequency control circuitry.

Such method may be carried out in any of numerous power delivery applications, e.g., operating the electrical power conversion system to charge rechargeable batteries of motive vehicles, such as electric automotive or material handling vehicles or stationary power such as UPS systems. The method may be conducted to deliver power at various predetermined levels, e.g., levels in a range of from 5 to 50 Kilowatts, or from 10 to 30 Kilowatts, or other suitable power level. The method may likewise be conducted to modulate switching frequency at any suitable levels, e.g., modulating switching frequency to control power delivery operation within a frequency range from the low power regime to the maximum power output, in which the frequency range is within a range of from 15 to 100 KHz, or within a range of from 20 to 80 KHz, or other suitable range.

The heat generation incident to operation of a kilowatt-scale high-frequency power conversion system in low power domains in the absence of the frequency modulation of the present disclosure can substantially compromise switching transistors and other components of the switching circuitry, and consequently severely shorten the service life of the power conversion system. The heat generation issue may be particularly detrimental when the switchable power delivery circuitry undergoes high levels of hard switching at power output levels in the low power regime.

The frequency-controlled kilowatt-scale high-frequency electrical power conversion system and method of the present disclosure resolve this heat generation issue and provide effective thermal management of the power conversion system. As a result, the power conversion system achieves higher-efficiency power delivery without low power regime heat generation effects that would otherwise substantially reduce such efficiency.

Figure 1:
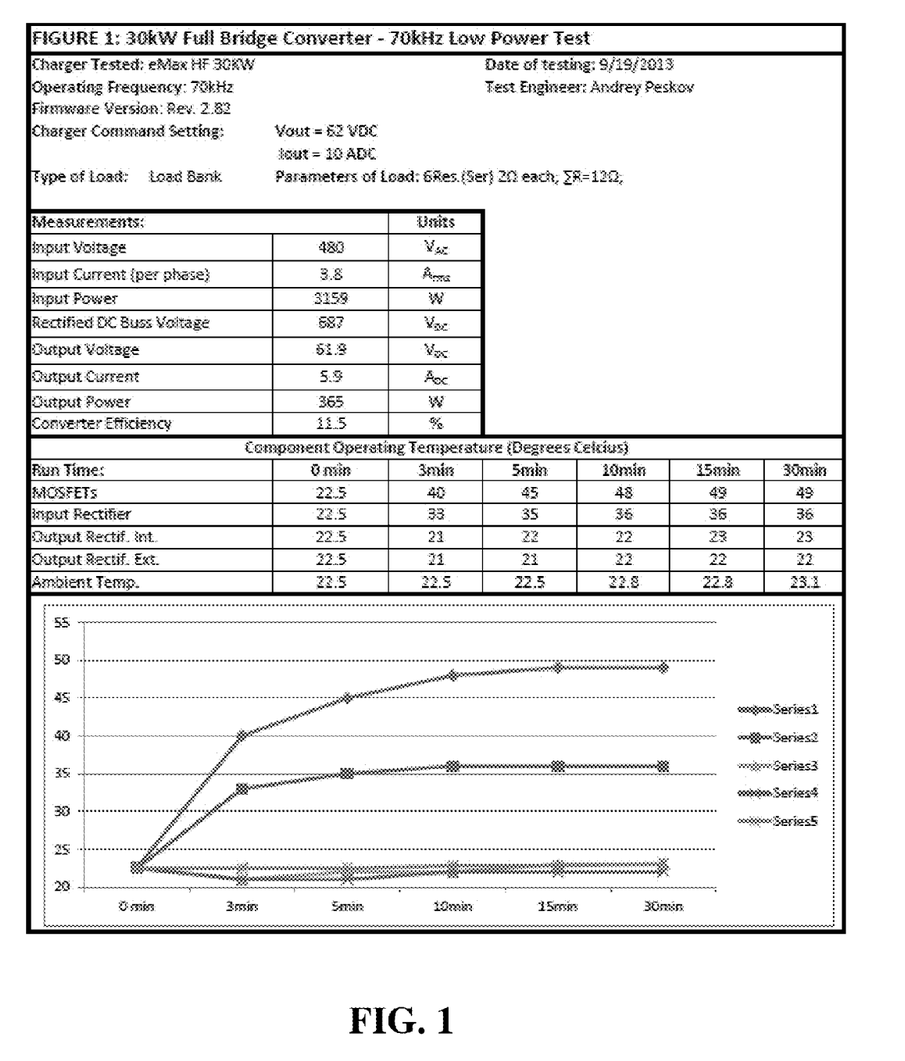
FIGS. 1 and 2 show data for an electrical power conversion system operating at low load conditions, at frequency of 70 KHz and 30 KHz, respectively.
Figure 2:
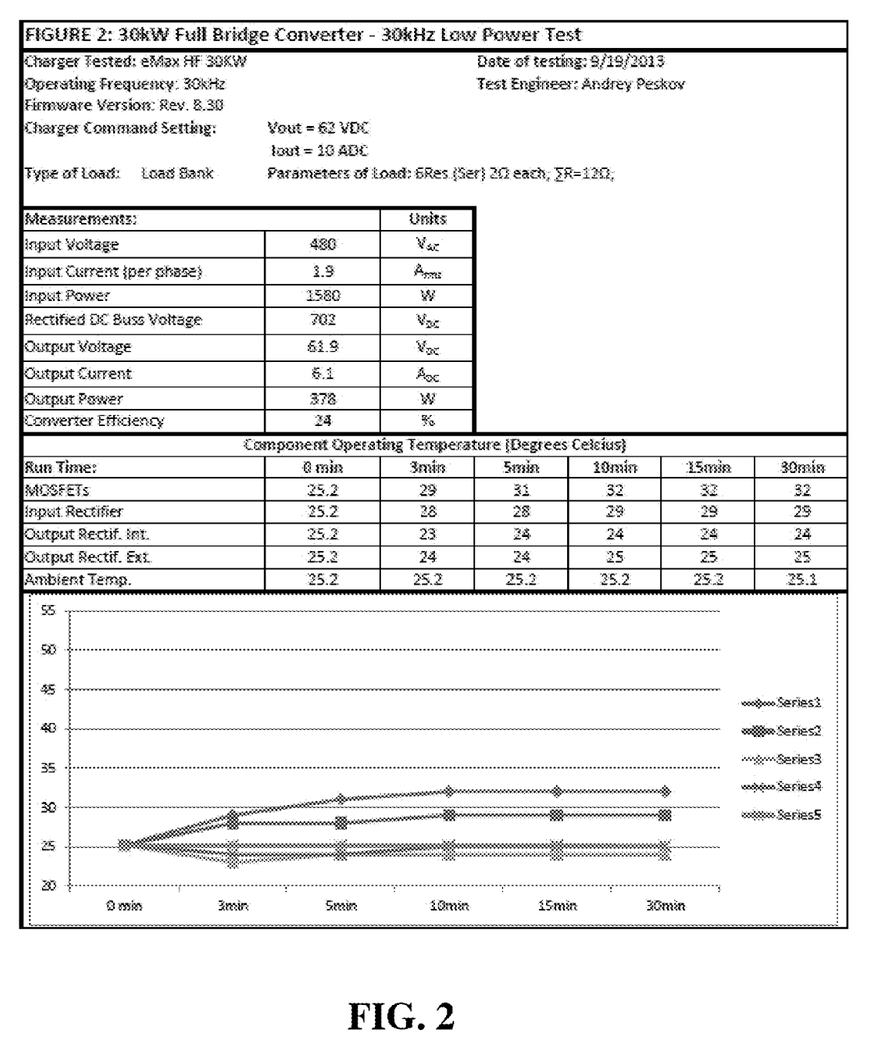

Referring now to the drawings in connection with the subsequent disclosure, FIGS. 1 and 2 show data for an electrical power conversion system operating at low load conditions, at frequency of 70 KHz and 30 KHz, respectively.

Figure 3:
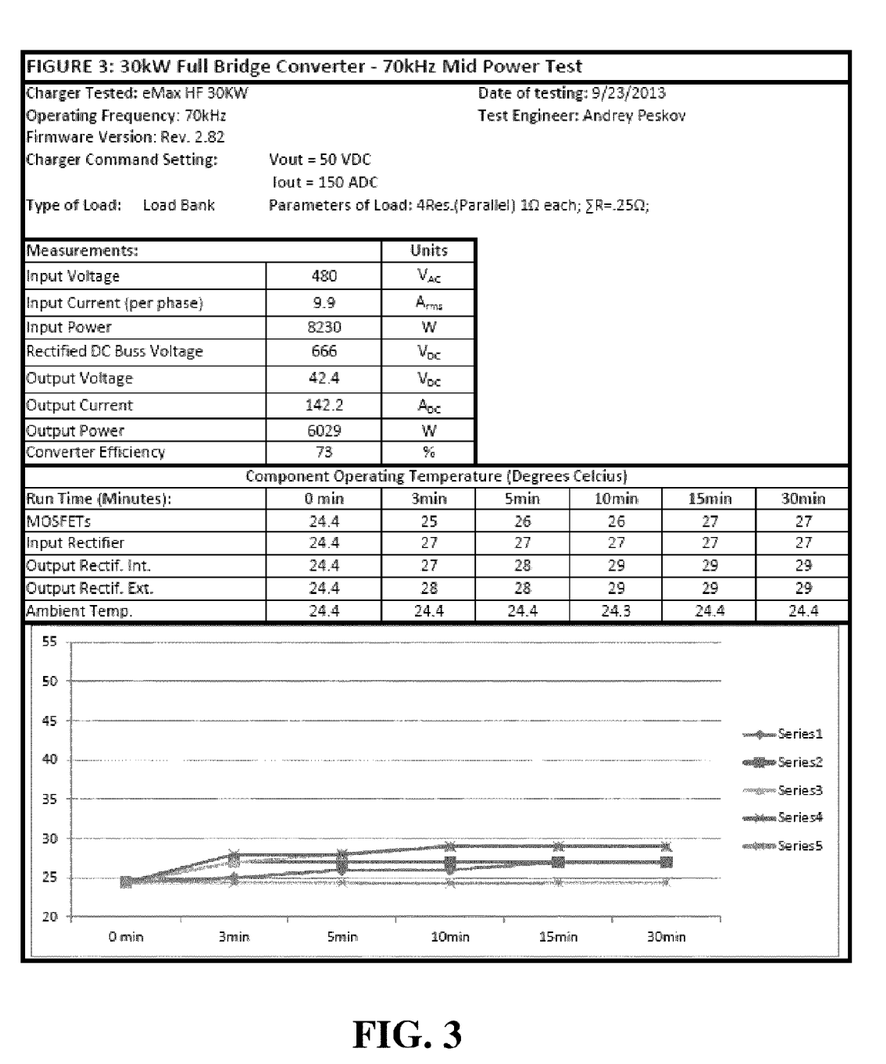
FIGS. 3 and 4 show data for the electrical power conversion system of FIGS. 1 and 2, operating at mid-level output power conditions, at frequency of 70 KHz and 30 KHz, respectively.
Figure 4:
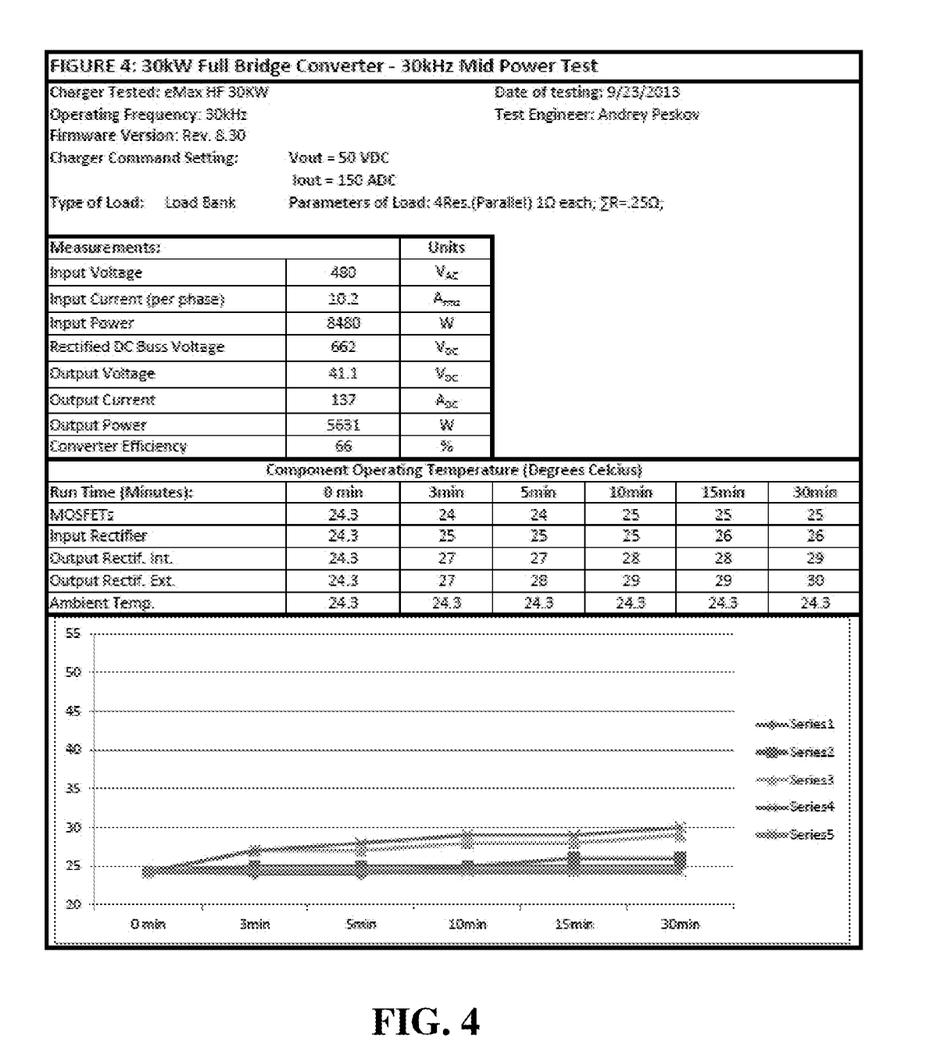

FIGS. 3 and 4 show data for the electrical power conversion system of FIGS. 1 and 2, operating at mid-level output power conditions, at frequency of 70 KHz and 30 KHz, respectively.

Figure 5:
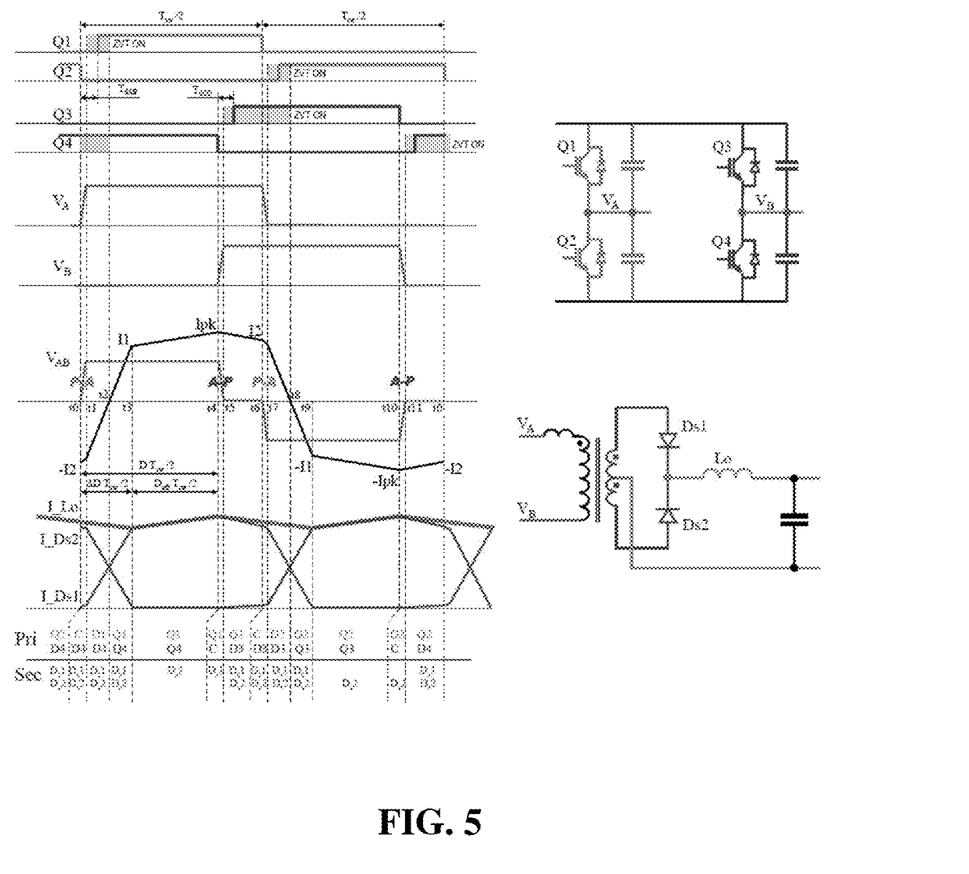
FIG. 5 shows full bridge converter circuitry and associated waveforms.

FIG. 5 shows full bridge converter circuitry and associated waveforms.

Figure 6:
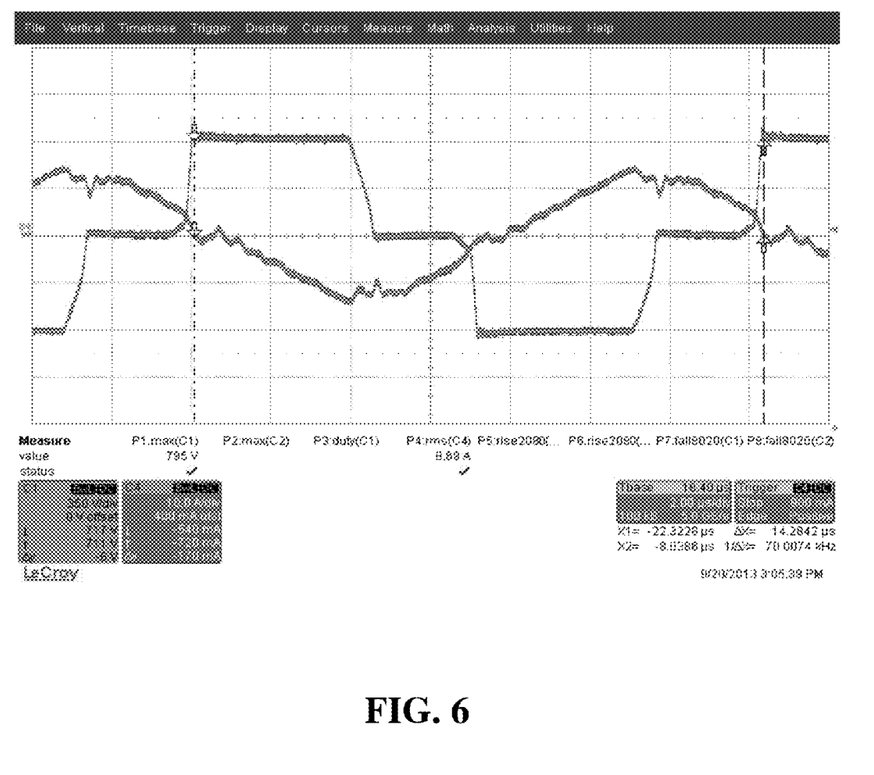
FIGS. 6 and 7 show full bridge converter waveforms of a converter operating at low load conditions, at frequency of 70 KHz and 30 KHz, respectively.
Figure 7:
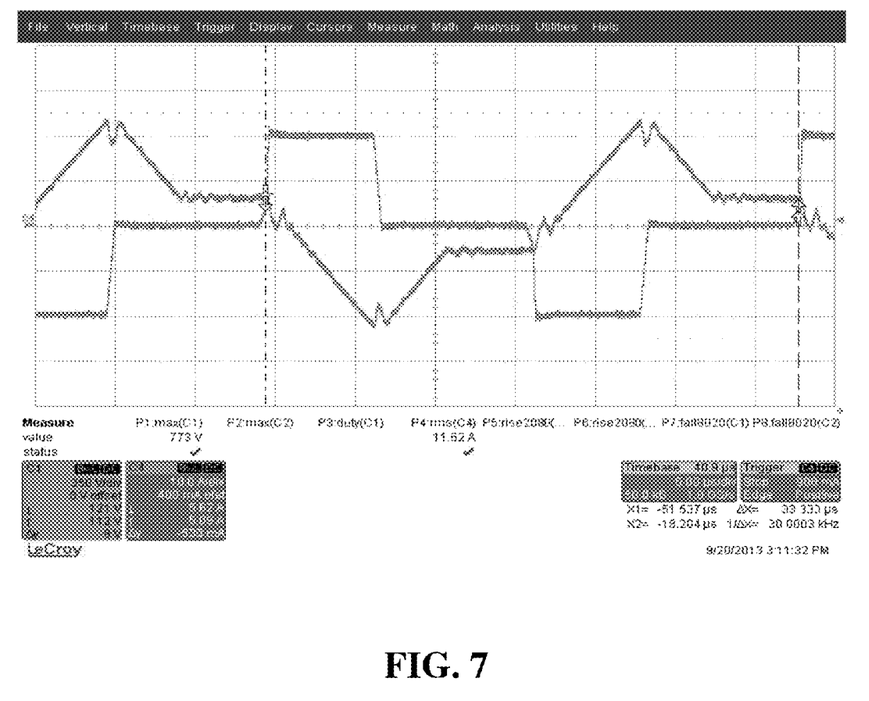

FIGS. 6 and 7 show full bridge converter waveforms of a converter operating at low load conditions, at frequency of 70 KHz and 30 KHz, respectively.

The frequency-modulated power conversion system and method of the present disclosure resolve the thermal management issues inherent in the operation of large high-frequency monolithic switching power converters used in industrial battery charging applications, such as charging of rechargeable batteries of vehicles such as forklifts, golf carts, and electrical automotive vehicles. Specifically, optimally designed large high frequency monolithic switching power converters when operated at mid-to high-output power output at high frequency exhibit acceptable temperature rise in the switching transistors of the switchable power delivery circuitry. At low output power levels, however, typically a small fraction of the full load capacity, the semiconductors in such large monolithic switching power converters generate excessive heat, e.g., as a result of hard switching and other dissipative factors in the transistors, that can result in premature failure of such circuitry and components. Under these low output power conditions, switchable transistors of the power delivery circuitry do not switch effectively and heat is generated that is proportionally in substantial excess to the normal switching losses realized at higher output currents. As a result, the circuitry and components are subjected to excessive operating temperatures and extreme thermal cycling, and operational lifetime of the power conversion system is severely diminished.

In battery charging power converters, the charging operation requires low power output in the latter stages of battery charging, and a single large power converter operated at high-frequency exhibits low switching efficiencies in the low power output mode, as discussed above. The power conversion system and method of the present disclosure resolve these deficiencies, by dynamically lowering the switching frequency of the switching power converter, and such frequency modulation has been found to lower semiconductor heating and achieve more efficient low-power operation. This raises the efficiency of the power converter when operating at power outputs much lower than the full load rating. Further, reactive components of the power conversion system can be safely operated at lower frequencies since they are being used to less than their full power capacities, thereby enabling the use of smaller size components, in spite of the lower switching frequency utilized in the low output power regime.

FIGS. 1 and 2 show data for a full bridge power conversion system operating at a light load at a design frequency of 70 kHz and at 30 kHz, respectively. As shown in such figures, the temperature of the components is significantly less at 30kHz than at 70 kHz. The full bridge is hard switching and is not in ZVS (Zero Voltage Switching) mode.

By significantly lowering the frequency of operation when operating at very low power outputs, excessive heating of power semiconductors was eliminated, even while continuing to hard switch the transistors.

FIGS. 3 and 4 show electrical data for the same power converter operating at 70 kHz and 30 kHz, respectively, at a mid level output power. It is apparent that there is not a significant difference in heating at higher output power. The temperatures of the transistors at 30 kHz and 70 kHz are very similar when the system was operated at a mid level output of approximately 6 kW. The transistors still appear to be hard switching at such power levels.

FIG. 5 shows full bridge converter circuitry and associated waveforms, for an H-bridge converter.

FIGS. 6 and 7 show full bridge power converter waveforms for the same power converter operating at 70 kHz and 30 kHz, respectively. With a constant low power output, at the same voltage and current, for the two switching frequencies tested, 70 kHz and 30 kHz, the duty cycle at the higher frequency is larger than that at the lower frequency operation because of the greater dissipation of the bridge transistors at that frequency. The duty cycles are different at the two frequencies for a constant power output because the control system is compensating for higher losses in the converter at the higher frequency. This is indicative of the higher efficiencies at lower frequencies with very low output currents.

The analysis of expected versus realized increase in efficiency between operation at 70 kHz and 30 kHz indicated primary sources of loss in the power converter system as comprising the primary switching section including full wave diode rectification and switching transistor full bridge circuitry and components, and the secondary transformer and rectification section including high-frequency transformers, diode rectification, output inductive and capacitive filtering circuitry and components.

Efficiency losses that are a function of frequency include switching losses from bridge output circuits to the transformer primary and the diode reverse recovery currents observed during switching, as well as conduction losses, and charging/discharging of gate and drain-source parasitic capacitance of MOSFET transistor components. These losses are decreased by decreasing switching frequency, and transistor switching power loss is decreased at lower frequency, particularly during hard switching. Transistor switching losses are attributable to the nonzero product of the drain current and drain to source voltage.

The power switching loss is expressed by the equation:

$$P_{sw1}=[(t_{sw1on}*V_{off}*I_{on}*f_{sw})/2+(t_{sw1off}*V_{off}*I_{on}*f_{sw})/2]$$

where $V_{off}$ is the drain source voltage when the MOSFET is off, $t_{sw1on}$ and $t_{sw1off}$ are the time to turn the MOSFET on and off, and $f_{sw}$ is the switching frequency.

Conduction power loss, when the MOSFET is on, is expressed by the equation:

$$P_{cond}=I^2_{on}*R_{dson}*D$$

where $I_{on}$ is the drain current, $R_{dson}$ is the on-state drain-source resistance and D is the duty cycle of the MOSFET.

The amounts of gate energy required to charge and discharge the MOSFETs parasitic gate capacitances, Cgs and Cgd, each switching period, varies with frequency, i.e., higher frequency requires more gate energy, but does not vary greatly with load. This energy is usually dissipated through resistance in series with the gate drive circuit. MOSFET gate loss, Pg, is given by the following equation:

$$Pg = Q_g * f_s * V_{cc}$$

where $Q_g$ is the total gate charge, $f_s$ is the switching frequency and $V_{cc}$ is the driver supply voltage.

As the MOSFET switches on and off, its intrinsic drain-source parasitic capacitance stores and then dissipates energy during each switching transition. The corresponding losses are proportional to the switching frequency and the values of the parasitic capacitances. This is given by the following equation:

$$P_{sw} = C_{oss} V^2_{off} f_{sw}$$

where $C_{oss}$ is the output capacitance of the MOSFET, $V_{off}$ is the drain source voltage when the MOSFET is off, and $f_{sw}$ is the switching frequency.

The reverse recovery of the body or external diodes during every switch cycle generates heat both in the diode and the transistor supplying the diode. This effect can be significant when switching currents very quickly. A certain amount of "reverse recovery time" $t_r$ (on the order of tens of nanoseconds to a few microseconds) may be required to remove the reverse recovery charge $Q_r$ from the diode. During this recovery time, the diode can actually conduct in the reverse direction, and device does not attain its blocking capability until the mobile charge in the junction is depleted.

Analysis including the assessment of the foregoing circuitry and component effects and empirical observation has confirmed that losses at high switching frequencies at low power output are substantial, and that the frequency modulation approach of the present disclosure enables the power conversion system to achieve significantly better performance at low power output when switching is dynamically reduced to lower frequencies.

In one embodiment, the frequency-modulated power converter system of the present disclosure utilizes a large, monolithic, high-frequency, high power full bridge switching power section, such as an H-bridge converter of the type shown with associated waveforms in FIG. 5. Such converter is designed to operate at higher frequencies enabling use of smaller reactive (magnetic storage, inductive, and capacitive) components to minimize cost and space requirements for the switching power converter. At high power outputs, the components must be used at or near their rated operational frequencies to prevent failure due to saturation, excessive currents and resulting heat.

Such converter is operated at full frequency (70 kHz in the case of the apparatus considered) for power outputs in excess of about 5-15% of full load rating (40-100 A for a 640 A rating). When operated at high power the semiconductors in such apparatus are soft switching and very efficient. When the converter output drops below about 5-15% of rated full power, the frequency control circuitry employed in accordance with the present disclosure will operate to reduce the frequency of the switchable power delivery circuitry, to reduce heating of the switching semiconductors and to thereby substantially increase the efficiency of the power conversion system.

As discussed herein, frequency adjustment can be accomplished with a digital controller employing firmware that is configured for frequency modulation of the switchable power delivery circuitry.

Illustrative firmware code is set out in Table 1 below.

TABLE 1

Power Converter Frequency Switching Firmware

```
if(!InInitRamp &&
PowerActual.ChargerSubMode!=SUBMODE_CONSTANT_CURRENT &&
PowerActual.ChargerSubMode!=SUBMODE_SOC_INIT &&
PowerActual.ChargerSubMode!=SUBMODE_TRICKLE && TimerExpired(ToggleFrequency))
{
    if((PowerActual.Amps_Q5 > FrequencySwitching.ReturnTo70KHZamps_Q5) &&
DroppedTo30KHZ)
    {
        PauseForFreqChange( );//Stops PWMs, restarts with new frequency
        SetTimer(&ToggleFrequency, TIMER_1_SECOND*10); //Hysteresis to
prevent bouncing
    }
    else if((PowerActual.Amps_Q5 < FrequencySwitching.DropTo30KHZamps_Q5) &&
!DroppedTo30KHZ)
    {
if(PowerTarget.Amps_Q5 > FrequencySwitching.DropTo30KHZamps_Q5) //if in CV
Mode, target Current is still CC Mode target
        {
            PowerTarget.Amps_Q5 = FrequencySwitching.CCrestartTargetAmps_Q5;
//Must lower current target to prevent spike, but target must still be >
output current for CV mode
        }
        PauseForFreqChange( );//Stops PWMs, restarts with new frequency
        SetTimer(&ToggleFrequency, TIMER_1_SECOND*10); //Hysteresis to
prevent bouncing
    }
}
Supporting Functions:
void PauseForFreqChange(void)
{
    Uint16 ctr = 0;
    StopPWMs( );
    while(ctr++ < 10000) //Pause to allow outputs to settle
        ;;
```

TABLE 1-continued

Power Converter Frequency Switching Firmware

```
            if(!DroppedTo30KHZ)
            {
                    StartPWMs(PWM_Freq[PWM_30KHZ]);
                    DroppedTo30KHZ = true;
            }
            else
            {
                    StartPWMs(PWM_Freq[PWM_70KHZ]);
                    DroppedTo30KHZ = false;
            }
    }
    void StartPWMs(Uint32 StartFreq)
    {
            PowerActual.Frequency = StartFreq/1000;
            ChangeFreq(StartFreq);
            PWMPhInit( );
            EALLOW;
                    EPwm2Regs.TZSEL.bit.CBC2 = TZ_ENABLE;        //enable PK I limit on Bridge current
                    EPwm3Regs.TZSEL.bit.CBC2 = TZ_ENABLE;        //enable PK I limit on Bridge current
                    // Trip zone clear register ePWM2
                    EPwm2Regs.TZCLR.bit.CBC = 1;                  // Clear any CBC events.
                    // Trip zone clear register ePWM3
                    EPwm3Regs.TZCLR.bit.CBC = 1;                  // Clear any CBC events.
                    EPwm2Regs.TZEINT.bit.CBC = 1;                 // Enable cycle by cycle interrupt.
            EDIS;
            EPwm2Regs.AQCSFRC.bit.CSFA = 0;// disable continuous force low
            EPwm2Regs.AQCSFRC.bit.CSFB = 0;// disable continuous force low
            EPwm3Regs.AQCSFRC.bit.CSFA = 0;// disable continuous force low
            EPwm3Regs.AQCSFRC.bit.CSFB = 0;// disable continuous force low
            //wait for CSFx to take effect ~25us
            //set semaphores to enable bridge PWMs and delay setpoints to take affect
            EnableBridgePWM = true;
            SetPointDelay = 167;                    //ensure a minimum Duty Cycle on start up. used in B3
            CNTL_2P2Z_Out2 = &phase;                // Current Output controls phase
            CC_Mode = true;                         //always start in CC Mode
            CNTL_2P2Z_Out1 = &DummyPhase;           // Voltage Output points to dummy phase
    }
    void StopPWMs(void)
    {
            //disable Brg
            BRG_RESET;
            EnableBridgePWM = false;
            EPwm2Regs.AQCSFRC.bit.CSFA = 1;   // continuous force low
            EPwm2Regs.AQCSFRC.bit.CSFB = 1;   // continuous force low
            EPwm3Regs.AQCSFRC.bit.CSFA = 1;   // continuous force low
            EPwm3Regs.AQCSFRC.bit.CSFB = 1;   // continuous force low
            //reset charger targets
            Gui_IfboutSet_Q5 = 0;                        //clamps Max current at this level
            Gui_VfbSet_Q8= 0;                            //Sets the Voltage clamp
            Vref = 594;                       // Re-initialise to a small command (2V)
            Iref = 0;
    }
    void ChangeFreq(Uint32 Freq)
    {
            ZVS_Period = CPU_FREQ/Freq;
            //No odd numbers
            if (ZVS_Period % 2)
                    ZVS_Period++;
            //Set PWM Regs accordingly
            EPwm2Regs.TBPRD = ZVS_Period;
            // Compare regs set initial duty cycle.
            EPwm2Regs.CMPA.half.CMPA = ZVS_Period/2;            // CMPA sets PWM duty cycle.
            EPwm2Regs.CMPB = (ZVS_Period * 4/5);                // CMPB sets the interrupt point.
            EPwm3Regs.TBPRD = ZVS_Period;
            // Compare regs set initial duty cycle.
            EPwm3Regs.CMPA.half.CMPA = ZVS_Period/2;            // CMPA sets PWM duty cycle.
            // At TBCNT3 = (TBPRD3 + TBPHS3)/2 SOCA is triggered
```

TABLE 1-continued

Power Converter Frequency Switching Firmware

| | |
|---|---|
| EPwm3Regs.CMPB = ZVS_Period/2; | // Intialize CMPB3 to some know value change in int |
| } | |

The frequency switching firmware algorithm includes three main variables: (i) the point at which switching to lower frequency, e.g., to 30 kHz from a higher frequency level of 70 kHz, is effected, (ii) the new target current when pulse width modulation or phase control operation elements are restarted, and (iii) the point at which switch back to higher frequency, e.g., the higher frequency level of 70 kHz, is effected when the output current significantly increases. In the illustrative 70 kHz/30 kHz system, the current point (i) may be 40 A, the target current (ii) may be 40% over the switching point current, and the current point (iii) may be 20% over the switching point current.

The firmware code advantageously sets a target current higher than the output current to ensure that the power conversion system goes into a short constant current mode before dropping back to the constant voltage mode, thereby preventing a spike in output current to the previous target current determined by the original constant current mode of operation.

The firmware code is constituted to check the output current every 5 ms in the firmware's IdlePower function, ensuring first that the system is not in any of the three constant current modes of Constant Current, Initial State of Charge, and Trickle, and also ensuring that the system is not in a mode in which the system is gradually stepping up the current to maximum amperage output (InInitRamp).

The firmware code provides a 10 second hysteresis to prevent bouncing of the system between the two frequencies, and to ensure that the output current has stabilized to the new target before checking again for a necessary frequency change.

It will be understood that analog or combinatorial logic circuitry can be utilized in lieu of digital circuitry, in specific implementations of the frequency-modulated power conversion system and method of the present disclosure.

The kilowatt-scale high-frequency electrical power conversion systems and methods of the present disclosure provide efficient control in applications such as fast charging of rechargeable batteries of electrical vehicles, in which high efficiency must be maintained at varying power and load conditions, even at the end portion of the charging cycle when state of charge of a battery has been raised to elevated level but the battery still requires final charging to achieve fully or otherwise adequately charged status.

The systems and methods of the present disclosure achieve high efficiency under such required low-power conditions, by frequency modulation that avoids or at least substantially attenuates the thermal overload conditions that would otherwise cause excessive heat generation in the switching circuitry of the power conversion system.

As disclosed herein, the frequency modulation control can be implemented using a microprocessor and associated firmware to measure current in the power conversion system and responsively control the switching frequency of transistors in the switching circuitry of the power conversion system. The firmware is constituted with a control algorithm that will operate the power conversion system at higher frequency under mid to high level load conditions, and will lower the transistor switching frequency whenever the power conversion system is operating below a selected minimum current level.

As discussed herein, the transistor switching frequency can be changed in discrete frequency domains, e.g., between a single high switching frequency value and a single low switching frequency value, as a high/low switching frequency system that is switched from a high switching frequency outside of a specified low-power regime, to a low switching frequency in the specified low-power regime. Alternatively, the transistor switching frequency can be changed at multiple intervals of switching frequency, or continuously during variable power outlet operation, dependent on the external load of the power conversion system and the corresponding power level involved in the power delivery operation.

While the disclosure has been set out herein in reference to specific aspects, features and illustrative embodiments, it will be appreciated that the utility of the disclosure is not thus limited, but rather extends to and encompasses numerous other variations, modifications and alternative embodiments, as will suggest themselves to those of ordinary skill in the field of the present disclosure, based on the description herein. Correspondingly, the invention as hereinafter claimed is intended to be broadly construed and interpreted, as including all such variations, modifications and alternative embodiments, within its spirit and scope.

What is claimed is:

1. A kilowatt-scale high-frequency electrical power conversion system adapted for variable output power delivery, said system comprising:
   switchable power delivery circuitry generating thermal overload at power output level in a low power regime that is substantially below maximum power output of said switchable power delivery circuitry, wherein switching components of said switchable power delivery circuitry in said low power regime generate substantially higher heat than is generated by them in operation at power output level outside of said low power regime; and
   frequency control circuitry adapted to dynamically reduce switching frequency of said switchable power delivery circuitry during transition from variable output power delivery operation outside of the low power regime to operation in said low power regime and to maintain switching frequency of said switchable power delivery circuit in said low power regime at sufficiently low level to at least partially reduce said substantially higher heat that would occur in the absence of the frequency control circuitry.

2. The system of claim 1, wherein the switchable power delivery circuitry comprises switchable MOSFET full bridge circuitry.

3. The system of claim 1, wherein the switchable power delivery circuitry comprises switchable IGBT circuitry.

4. The system of claim 1, wherein the frequency control circuitry is comprised in a digital controller that is programmatically arranged with firmware enabling the digital controller to control switching frequency of said switchable power delivery circuitry.

5. The system of claim 4, wherein the firmware specifies (i) a switching point current value of at which the transition to operation in the low power regime is triggered, (ii) a value of target current for pulse width modulation operation or phase control operation of the switchable power delivery circuitry in the low power regime, and (iii) a current increase value for reversing transition of the switchable power delivery circuitry to operation outside of said low power regime.

6. The system of claim 1, wherein the frequency control circuitry is configured for hysteresis operation so that output current of the system is stabilized to a new target current prior to initiation of a frequency change.

7. The system of claim 1, wherein the frequency control circuitry is configured for operation of the switchable power delivery circuitry outside the low power regime at a first switching frequency, and operation of the switchable power delivery circuitry in the low power regime at a second switching frequency.

8. The system of claim 1, wherein the frequency control circuitry is configured for operation of the switchable power delivery circuitry in multiple discrete or continuously compensated power domains between the maximum power output and the low power regime.

9. The system of claim 1, configured for charging of batteries of motive vehicles.

10. The system of claim 8, wherein said motive vehicles comprise electric automotive vehicles.

11. The system of claim 1, wherein the switchable power delivery circuitry is configured for operation as a buck converter, boost converter, buck-boost converter, forward converter, full bridge converter, or half bridge converter.

12. The system of claim 1, wherein said switching components of said switchable power delivery circuitry in said low power regime generate substantially higher heat than is generated by them in operation at maximum power output of said switchable power delivery circuitry.

13. The system of claim 1, wherein said switchable power delivery circuitry is adapted to deliver power in a range of from 5 to 50 Kilowatts.

14. The system of claim 1, wherein said switchable power delivery circuitry is adapted to deliver power in a range of from 10 to 30 Kilowatts.

15. The system of claim 1, wherein said frequency control circuitry is configured to control power delivery operation within a frequency range from said low power regime to said maximum power output, wherein said frequency range is within a range of from 15 to 100 KHz.

16. The system of claim 1, wherein said frequency control circuitry is configured to control power delivery operation within a frequency range from said low power regime to said maximum power output, wherein said frequency range is within a range of from 20 to 80 KHz.

17. The system of claim 1, wherein the low power regime that is more than 80% below maximum power output of said switchable power delivery circuitry.

18. The system of claim 1, wherein the low power regime comprises a power output range that is within a range of from 5% to 25% of the maximum power output of said switchable power delivery circuitry.

19. A method of operating a kilowatt-scale high-frequency electrical power conversion system adapted for variable output power delivery, and comprising switchable power delivery circuitry generating thermal overload at power output level in a low power regime that is substantially below maximum power output of said system, said method comprising dynamically reducing switching frequency of said switchable power delivery circuitry during transition from variable output power delivery operation outside of the low power regime to operation in said low power regime and maintaining switching frequency of said switchable power delivery circuit in said low power regime at sufficiently low level to at least partially reduce said substantially higher heat that would occur in the absence of the frequency control circuitry.

20. The method of claim 19, comprising operating the electrical power conversion system to charge rechargeable batteries of motive vehicles.

21. The method of claim 19, comprising operating the electrical power conversion system to charge rechargeable batteries of electric automotive vehicles.

22. The method of claim 19, wherein said switchable power delivery circuitry is adapted to deliver power in a range of from 5 to 50 Kilowatts.

23. The method of claim 19, wherein said switchable power delivery circuitry is adapted to deliver power in a range of from 10 to 30 Kilowatts.

24. The method of claim 19, comprising modulating switching frequency to control power delivery operation within a frequency range from said low power regime to said maximum power output, wherein said frequency range is within a range of from 15 to 100 KHz.

25. The method of claim 19, comprising modulating switching frequency to control power delivery operation within a frequency range from said low power regime to said maximum power output, wherein said frequency range is within a range of from 20 to 80 KHz.

* * * * *